United States Patent [19]

Schloman, Jr.

[11] Patent Number: 4,739,038

[45] Date of Patent: Apr. 19, 1988

[54] PROCESS FOR THE CONTROLLED PARTITION OF GUAYULE RESIN

[75] Inventor: William W. Schloman, Jr., Stow, Ohio

[73] Assignee: The Firestone Tire & Rubber Company, Akron, Ohio

[21] Appl. No.: 8,726

[22] Filed: Jan. 30, 1987

[51] Int. Cl.$^4$ .............................................. C08C 4/00
[52] U.S. Cl. ...................................... 528/930; 528/497
[58] Field of Search ................................. 528/930, 497

[56] References Cited

U.S. PATENT DOCUMENTS

| | | | |
|---|---|---|---|
| 2,549,763 | 4/1951 | Banigan et al. | 528/930 |
| 2,572,046 | 10/1951 | Meeks et al. | 528/930 |
| 4,435,337 | 3/1984 | Kay et al. | 528/930 |
| 4,542,191 | 9/1985 | Kay et al. | 528/930 |
| 4,591,631 | 5/1986 | Beattie et al. | 528/930 |
| 4,616,068 | 10/1986 | Schloman et al. | 528/930 |
| 4,622,365 | 11/1986 | Schloman et al. | 528/930 |
| 4,623,713 | 11/1986 | Beinor et al. | 528/930 |

OTHER PUBLICATIONS

Foster et al, "A Technology Assessment of Guayule Rubber Commercialization", pp. 67-73, N.T.I.S., (1980).
"Guayule Byproduct Evaluation: Extract Characterization", J. Agric. Food Chem. 1983, 31, 873-876, W. W. Schloman, Jr., R. A. Hively, Anoop Krishen, A. M. Andrews.

Primary Examiner—James H. Reamer
Attorney, Agent, or Firm—Daniel N. Hall

[57] ABSTRACT

A hydrocarbon insoluble polar fraction is extracted from guayule-like resins by adding a hydrocarbon solvent containing a small amount of water therein to the guayule-like resins and mixing the same. A two-phased solution is formed with the hydrocarbon insoluble polar fraction being located in the water phase. The addition of water to the hydrocarbon increases the yield of the insoluble polar fraction as well as the acid number and the amount of ketoalcohol located therein.

19 Claims, No Drawings

PROCESS FOR THE CONTROLLED PARTITION OF GUAYULE RESIN

FIELD OF THE INVENTION

The present invention relates to utilizing small amounts of water in association with a hydrocarbon solvent which when added to a guayule-like resin partitions the same into a hydrocarbon solvent soluble non-polar fraction and into a hydrocarbon solvent insoluble polar fraction.

BACKGROUND

Heretofore, sesquiterpene esters and essential oils have been obtained from guayule-like resins.

U.S. Pat. No. 2,549,763 to Banigan, et al, relates to a process for isolating betaine from guayule extract. The aqueous non-resinous extract phase was isolated, diluted with alcohol, and treated with phosphoric acid. No treatment or extraction with regard to the guayule resin was employed.

U.S. Pat. No. 2,572,046 to Meeks, et al, relates to a process for isolating parthenyl cinnamate and essential oils from guayule resin by mixing a water-miscible, organic solvent solution of the guayule resin with a hydrocarbon in which the parthenyl cinnamate is more soluble than in the organic solvent and separating the hydrocarbon containing the parthenyl cinnamate from the mixture.

U.S. Pat. No. 4,542,191 to Kay, et al, relates to tackifying agents for rubber by chemically treating a guayule resin fraction with such compounds such as formaldehyde, phenol/formaldehyde, urea formaldehyde, and the like. The guayule resin can be extracted with polar solvents.

U.S. Pat. No. 4,616,068 to Schloman and Davis relates to improving physical properties of rubber compositions by chemically treating guayule-type resins with a polyamine.

U.S. Pat. No. 4,622,365 to Schloman and Davis relates to improving physical properties of rubber compositions by chemically treating guayule-type resins with an amine terminated polyether.

The article "Guayule Byproduct Evaluation: Extract Characterization", by Schloman, et al, J. Agric. Food Chem., 1983, 31(4), 873–876, relates to composition profiles of water and acetone extracts of guayule woody tissue.

SUMMARY OF THE INVENTION

It has been found that the hydrocarbon insoluble polar fraction yield of guayule-like resins can unexpectantly be increased by extracting the same with a hydrocarbon solvent containing an effective amount of water therein.

A process for obtaining a hydrocarbon insoluble polar fraction from guayule-like resin comprises, adding a saturated hydrocarbon solvent to a guayule-like resin, adding an effective amount of water to said solvent to yield an increase in the amount of insoluble hydrocarbon polar fraction obtained from the guayule-like resin; mixing said resin, said saturated hydrocarbon solvent, and said water; and obtaining a saturated hydrocarbon insoluble polar fraction.

DETAILED DESCRIPTION OF THE INVENTION

According to the present invention, guayule or guayule-like resins are partitioned into a hydrocarbon solvent soluble non-polar fraction and into a hydrocarbon solvent insoluble polar fraction. The relative yields and compositions of these fractions are controlled by adjusting the ratio of hydrocarbon solvent to resin and by adding small amounts of water.

Among the plant materials that can be used as sources of guayule resins and guayule-like or guayule type resins are a large number of plant species bearing rubber and rubber-like hydrocarbons. These include particularly guayule itself, gopher plant (*Euphorbia lathyris*), mariola (*Parthenium incanum*), rabbitbrush (*Chrysothamnus nauseosus*), candelilla (*Pedilanthus macrocarpus*), Madagascar rubbervine (*Cryptostegia grandiflora*), milkweeds (*Asclepias syriaca, speciosa, subulata,* et al), goldenrods (*Solidago altissima*), *graminifolia, rigida,* et al), pale Indian plantain (*Cacalia atriplicifolia*), Russian dandelion (*Taraxacum kok-saghyz*), mountain mint (*Pycnanthemum incanum*), American germander (*Teucreum canadense*) and tall bellflower (*Campanula americana*). Many other plants which produce rubber and rubber-like hydrocarbons are known, particularly among the Asteraceae (Compositae), Euphorbiaceae, Campanulaceae, Labiatae, and Moraceae families.

Guayule-like resins are generally obtained from such plants, or from resinous rubber prepared from such plants, by extraction with an organic polar solvent. Such solvents include alcohols having from 1 to 8 carbon atoms, for example methanol, ethanol, isopropanel, and the like; esters having from 3 to 8 carbon atoms such as the various formates, the various acetates, and the like; and ketones having from 3 to 8 carbon atoms, such as acetone, methyl ethyl ketone. The preferred extraction solvent is acetone or ethyl alcohol. The resin generally constitutes from about 6 to about 15 percent of the dry weight of the plant. The resin can be obtained by any conventional extraction method such as solvent extraction of the whole shrub, including the leaves, the woody tissue, and the like. Before such extraction, the plants are desirably crushed or ground as, for example, by a hammermill. The organic polar solvent can then be added to the crushed guayule-like plant material to extract the resin therefrom. The extracted resin is then dried as by evaporation of the solvent. Naturally, other common or conventional resin extraction methods can be utilized. The extracted resin is generally dried.

The extracted guayule resin contains a wide variety of components with the most abundant constituents being triterpene ketoalcohols (see Rodriguez-Hahn et al, Rev. Latinoamer. Quim., 1970, 1(1), 24–28). Another constituent is the various diterpene ketoalcohols (see Dorado Bernal et al., Chim. Ind. (Paris), 1962, 87(5), 612–620). Other constituents include polyphenolics and free acids (see Buchanan et al., J. Am. Oil Chem. Soc., 1978, 55(9), 657W–662); sesquiterpene esters (see Romo et al., Rev. Latinoamer Quim., 1970, 1(3), 132–135), and fatty acid triglycerides (see Schloman et al., J. Agric. Food Chem., 1983, 31(4), 873–876).

Kay and Gutierrez (U.S. Pat. No. 4,542,191) teach that the hexane-insoluble residue recovered from guayule resin imparts improved tack and green strength properties to rubber compositions. Schloman and Davis (U.S. Pat. No. 4,616,068) teach that the insoluble polar residue compounds of guayule resin impart improved physical properties such as green strength building tack, etc. to rubber compositions when reacted with a polyamine. Schloman and Davis (U.S. Pat. No. 4,622,365) teach that the insoluble polar residue compounds of guayule resin impart improved properties such as tear strength, green stength, etc. to rubber compositions when reacted with an amine terminated polyether. The latter two patents also reveal that the reaction of the polyamine or the polyether is with various guayule resin components such as triterpene ketoalcohol and various free acids. Consequently, it is desirable to optimize the yield of the hydrocarbon-insoluble residue and the proportion of polar resin components therein.

According to the concepts of the present invention, the above extracted guayule resin is treated by mixing it with a saturated hydrocarbon solvent in the presence of water. Unexpectedly, it has been found that the addition of water to a mixture of resin and hydrocarbon solvent increases the yield of the insoluble residue, or polar resin fraction. It is often desirable to simultaneously add the water and saturated hydrocarbon solvent to the guayule-like resin. Suitable saturated hydrocarbon solvents include alkanes having from 4 to 9 carbon atoms, preferably 5-7 carbon atoms, such as hexane and cycloalkanes having from 5-10 carbon atoms, preferably 5-6 carbon atoms, such as cyclohexane. Aromatic solvents are not utilized since they generally will dissolve the various polar insoluble portions of the guayule resin.

Mixing of the guayule resin, water, and hydrocarbon solvent is carried out at a temperature which allows rapid dispersion of the resin, such as from about 10° C. to about 150° C., desirably from about 20° C. to about 100° C., and preferably from about 35° C. to about 55° C. The temperature utilized naturally should be below the boiling point of the solvent. Mixing is desirably carried out at approximately atmospheric pressure.

It is an important aspect of the present invention that good mixing be achieved so that the water and hydrocarbon solvent are intimately mixed with the guayule-like resin to achieve good extraction. Mixing is effected by mechanical agitation or by countercurrent flow of the hydrocarbon solvent with a mixture of water and guayule-like resin. After sufficient mixing has occurred, typically on the order of from about 5 to about 30 minutes, mixing is terminated and the solution allowed to form a two phase system. That is, an upper phase containing the hydrocarbon solvent and a soluble non-polar resin fraction, and a lower denser oily phase containing the water and an insoluble polar resin fraction. The less dense solution containing the non-polar resin fraction can be isolated by decanting. Once the phases have been separated, they are desirably physically processed as by vacuum or steam devolatilization or by means of a nitrogen sparge to remove water and any remaining solvent. Devloatilization removes low-boiling oils which often cause undesirable odors.

The proportion by weight of the water utilized is a small or low amount, that is, an effective amount to improve the yield of the insoluble hydrocarbon polar fraction. This amount can vary but generally is from about 0.5 to about 10 parts by weight of water and preferably from about 1 to about 5 parts by weight of water based upon 100 parts by weight of guayule resin. The amount of hydrocarbon solvent is from about 50 to about 500 parts by weight and preferably from about 100 to about 300 parts by weight of hydrocarbon solvent based upon 100 parts by weight of guayule resin.

The increased yield of the polar fraction, that is the hydrocarbon solvent insoluble polar fraction utilizing water, is generally a minimum of a 20% increase, desirably a minimum of a 25% increase, and preferably at least a 30% increase by weight. The increase in various ketoalcohols such as argentatin A is at least a 10% increase and preferably at least a 20% increase by weight.

The hydrocarbon insoluble polar fraction obtained by the present invention can be utilized in situations wherein such compounds are sought or required. They can also be utilized in imparting improved tack and green strength properties to rubber compositions as in the production of tires, conveyor belts, hoses, roofing membranes, shock absorbers, tank linings, O-rings, bumpers, and other mechanical rubber goods known to the art and to the literature.

The examples given below demonstrate the process of this invention in greater detail. Furthermore, these examples illustrate the properties of the desired polar fraction of guayule resin. These properties, including molecular weight, the acid number, and the levels of fatty acid triglycerides, a representative sesquiterpene ester, and a representative triterpene ketoalcohol, were determined in the following manner:

Gel permeation chromatography (GPC) following the procedure set forth in Budiman and McIntyre (Rubber Chem. Technol., 1981, 54(4), 871-881) was used to determine the resin molecular weight. The acid number was determined following the potentiometric procedure set forth in ASTM Method D803-65. The fatty acid triglyceride level was determined following the procedure set forth in Kruempelman and Danielson (J. Liquid Chromatog., 1982 5(9), 1679-1689). The guayulin A and argentatin A levels were determined following the procedures set forth in Schloman et al. (J. Agric. Food Chem., 1986, 34(2), 177-179).

EXAMPLES 1-8

A reactor was charged with resin, hexane, and water in amounts as set forth in Table I. Each mixture was heated to about 60° C. to soften the resin and then agitated without heating until the mixture had cooled to about 25° C. Each mixture was subsequently centrifuged at about 1500 rpm for about 20 min. The product mixtures of Examples 2 through 8 separated into two phases: an upper phase containing the non-polar resin fraction and a lower phase containing the polar resin fraction and water. The upper phase was removed by decanting. The temperature of the lower phase was raised to about 110°-150° C. during which time a nitrogen sparge was used to remove residual solvent and water.

EXAMPLES 9-11

A reactor was charged with resin and pentane in amounts as set forth in Table III. Each mixture was agitated for about 20 minutes. Water was added as shown in Table III and agitation continued for about 20 min. The product mixtures of Examples 9 through 11 separated into two phases after centrifuging in the manner described above. The upper phase was removed by decanting. The pressure in the reactor was reduced to about 1.3-2.7 MPa and the temperature raised to about 50° C. to facilitate distillation of residual solvent and water from the lower phase.

Table I illustrates that water added to mixtures of guayule resin and a saturated hydrocarbon solvent unexpectedly and significantly increased the yield of the hydrocarbon insoluble polar resin fraction. This is particularly apparent for resin-solvent mixtures which do not normally produce separate phases (Examples 1 and 2). Table II illustrates that the polar fractions obtained by the present invention have higher acid numbers, higher molecular weights, and higher concentrations of polar triterpene ketoalcohols such as argentatin A.

Table III illustrates that increasing amounts of water added to mixtures of guayule resin and a saturated hydrocarbon solvent significantly increase the yield of polar resin components in the polar resin fraction. The yield of argentatin A, a reactive polar triterpene ketoalcohol, is increased by about 22% upon the addition of 2 parts by weight of water to a mixture of 100 parts by weight of guayule resin and 200 parts by weight of pentane. The yields of unreactive, less polar ester components such as fatty acid triglycerides and guayulin A are relatively unaffected.

TABLE I

EFFECT OF ADDED WATER ON RESIN PHASE YIELDS, HEXANE PARTITION

| EXAMPLE NO. | PARTS BY WEIGHT | | | POLAR FRACT. YIELD, % |
|---|---|---|---|---|
| | RESIN | HEXANE | H$_2$O | |
| 1 | 100 | 100 | 0 | No separation |
| 2 | 100 | 100 | 4 | 14 |
| 3 | 100 | 200 | 0 | 26 |
| 4 | 100 | 200 | 2 | 34 |
| 5 | 100 | 200 | 4 | 36 |
| 6 | 100 | 300 | 0 | 27 |
| 7 | 100 | 300 | 2 | 36 |
| 8 | 100 | 300 | 4 | 35 |

TABLE II

EFFECT OF ADDED WATER ON RESIN FRACTION COMPOSITION, HEXANE PARTITION

| EXAMPLE NO. | ACID NUMBER | | MOLECULAR WGT.[a] | | ARGENTATIN A, %[b] | |
|---|---|---|---|---|---|---|
| | NON-POLAR | POLAR | NON-POLAR | POLAR | NON-POLAR | POLAR |
| 1 | NO SEPARATION | | | | | |
| 2 | — | 27 | 523 | 536 | 8.0 | 8.4 |
| 3 | — | 23 | — | 557 | — | 8.3 |
| 4 | — | 21 | — | 510 | — | 8.9 |
| 5 | 18 | 22 | 509 | 564 | 7.4 | 8.4 |
| 6 | — | 24 | — | 577 | — | 8.2 |
| 7 | — | 20 | — | 582 | — | 7.5 |
| 8 | 19 | 21 | 504 | 549 | 6.7 | 9.4 |

[a]Number-average molecular weight ($M_n$); for unfractionated resin, $M_n = 525$.
[b]For unfractionated resin, argentatin A % = 8.1.

TABLE III

EFFECT OF ADDED WATER ON RESIN FRACTION YEILD AND COMPOSITION, PENTANE PARTITION

| EX. NO. | PARTS BY WEIGHT | | | POLAR FRACT. YIELD, % | POLAR FRACTION COMPONENTS[a], % OF TOTAL RESIN CONTENT | | |
|---|---|---|---|---|---|---|---|
| | RESIN | PENTANE | H$_2$O | | TRIGLY-CERIDES | GUAYULIN A | ARGENTATIN A |
| 9 | 100 | 200 | 0 | 43 | 44 | 24 | 49 |
| 10 | 100 | 200 | 1 | 46 | 42 | 23 | 56 |
| 11 | 100 | 200 | 2 | 53 | 43 | 27 | 60 |

[a]Unfractionated resin composition: 3.6% triglycerides, 4.3% guayulin A, and 12.0% argentatin A.

While in accordance with the patent status, a best mode and preferred embodiment have been set forth in detail, the scope of the invention is not limited thereto, but rather by the scope of the attached claims.

What is claimed is:
1. A process for obtaining a hydrocarbon insoluble fraction from guayule-like resin, comprising the steps of:

adding a saturated hydrocarbon solvent having from 4 to 10 carbon atoms to a guayule-like resin, the amount of said saturated hydrocarbon solvent being from about 50 parts to about 500 parts by weight per 100 parts by weight of said guayule-like resin, adding an effective amount of water to said solvent to yield an increase in the amount of hydrocarbon insoluble polar fraction obtained from the guayule-like resin, mixing said resin, said saturated hydrocarbon solvent, and said water at a temperature below the boiling point of said solvent, said temperature being from about 20° C. to about 100° C., and obtaining a saturated hydrocarbon insoluble polar guayule resin fraction.

2. A process according to claim 1, wherein and wherein the amount of said water is from about 0.5 parts to about 10 parts by weight per 100 parts by weight of said guayule-like resin.

3. A process according to claim 2, wherein said saturated hydrocarbon is an alkane having from 4 to 9 carbon atoms, a cycloalkane having from 5 to 10 carbon atoms, or combinations thereof.

4. A process according to claim 3, wherein the amount of said saturated hydrocarbon solvent is from about 100 parts to about 300 parts by weight per 100 parts by weight of said guayule resin and wherein the amount of said water is from about 1 part to about 5 parts by weight per 100 parts by weight of said guayule resin.

5. A process according to claim 4, including forming a two-phase solution wherein the bottom phase contains said water and said saturated hydrocarbon insoluble polar fraction.

6. A process according to claim 5, including recovering said saturated hydrocarbon insoluble polar fraction.

7. A process according to claim 6, wherein said saturated hydrocarbon is an alkane having from 5 to 7 carbon atoms, a cycloalkane having 5 or 6 carbon atoms, or combinations thereof, and wherein said increased yield of said hydrocarbon insoluble polar fraction is at least 20% by weight.

8. A process according to claim 7, including mixing said water, said saturated hydroarbon solvent, and said guayule-like resin at a temperature of about 35° C. to about 55° C., and wherein said water and said resin are simultaneously added, and wherein the increased yield of said hydrocarbon insoluble polar fraction is at least 25% by weight.

9. A process according to claim 4, wherein said saturated hydrocarbon is an alkane having from 5 to 7 carbon atoms, a cycloalkane having 5 or 6 carbon atoms, or combinations thereof.

10. A process according to claim 9, including mixing said water, said saturated hydrocarbon solvent, and said guayule-like resin at a temperature of about 35° C. to about 55° C., and wherein said water and said resin are simultaneously added.

11. A process according to claim 9, including obtaining a hydrocarbon solvent soluble non-polar fraction, and wherein said saturated hydrocarbon insoluble polar fraction has a higher acid number and a higher molecular weight than said hydrocarbon solvent soluble non-polar fraction.

12. A hydrocarbon insoluble polar fraction of a guayule-like resin, comprising:
obtaining the hydrocarbon insoluble polar fraction by controlled partitioning of the guayule-like resin, said controlled partition achieved by adding a saturated hydrocarbon solvent having from 4 to 10 carbon atoms and an effective amount of water to a guayule-like resin, the amount of said saturated hydrocarbon solvent being from about 50 to about 500 parts by weight based upon 100 parts by weight of said guayule-like resin, mixing said water containing hydrocarbon solvent and said guayule-like resin at a temperature below the boiling point of said solvent at from about 20° C. to about 100° C. and forming the hydrocarbon insoluble guayule resin polar fraction.

13. A hydrocarbon insoluble polar fraction according to claim 12, wherein the amount of water is from about 0.5 parts to about 10 parts by weight based upon 100 parts by weight of said guayule-like resin, and wherein said hydrocarbon solvent is an alkane having from 4 to 9 carbon atoms, a cycloalkane having from 5 to 10 carbon atoms, or combinations thereof.

14. A hydrocarbon insoluble polar fraction according to claim 13, wherein the amount of said saturated hydrocarbon solvent is from about 100 parts to about 300 parts by weight per 100 parts by weight of said guayule resin and wherein the amount of said water is from about 1 part to about 5 parts by weight per 100 parts by weight of said guayule resin.

15. A hydrocarbon insoluble polar fraction according to claim 14, wherein said saturated hydrocarbon is an alkane having from 5 to 7 carbon atoms, a cycloalkane having 5 or 6 carbon atoms, or combinations thereof, wherein said increased yield of said hydrocarbon insoluble polar fraction is at least 20% by weight, wherein the increased amount of ketoalcohols in said hydrocarbon insoluble polar fraction is at least 10% by weight, and wherein said mixing temperature is from about 35° C. to about 55° C.

16. A hydrocarbon insoluble polar fraction according to claim 13, including adding said water and said hydrocarbon solvent simultaneously to said guayule-like resin.

17. A hydrocarbon insoluble polar fraction according to claim 15, including adding said water and said hydrocarbon solvent simultaneously to said guayule-like resin.

18. A hydrocarbon insoluble polar fraction according to claim 14, wherein said guayule-like resin is derived from guayule plants, wherein said increased yield of said hydrocarbon insoluble polar fraction is at least 25% by weight and wherein the increase amount of ketoalcohols in said hydrocarbon insoluble polar fraction is at least 20% by weight.

19. A hydrocarbon insoluble polar fraction according to claim 17, wherein said guayule-like resin is derived from guayule plants.

* * * * *